United States Patent [19]

Rein

[11] Patent Number: 5,296,315

[45] Date of Patent: Mar. 22, 1994

[54] DEVICE TO PERMIT THE USE OF NON-STANDARD BATTERIES TO POWER BATTERY OPERATED DEVICES

[76] Inventor: Clifford J. Rein, 345 Fireweed Ct., Windsor, Calif. 95492

[21] Appl. No.: 55,970

[22] Filed: Apr. 29, 1993

[51] Int. Cl.⁵ .............................................. H01M 2/10
[52] U.S. Cl. .................................... 429/100; 439/628; 429/121
[58] Field of Search ................................. 429/96–100, 429/123, 1, 9, 121; 439/628, 500, 504

[56] References Cited

U.S. PATENT DOCUMENTS

| | | | |
|---|---|---|---|
| 3,201,742 | 8/1965 | English | 339/58 |
| 3,301,712 | 1/1967 | Bach | 429/100 |
| 3,308,419 | 3/1967 | Rohowete et al. | 339/147 |
| 3,586,870 | 6/1971 | Cwiak | 307/66 |
| 3,998,516 | 12/1976 | Mabuchi | 339/153 |
| 4,037,026 | 7/1977 | Mabuchi | 429/100 |
| 4,946,396 | 8/1990 | Saitoh | 439/500 |
| 5,076,805 | 12/1991 | Welch | 439/568 |
| 5,187,026 | 2/1993 | Scrivano | 429/96 |

Primary Examiner—Anthony Skapars

[57] ABSTRACT

A device for providing power from a non-standard battery or batteries to a battery operated device powered by one or more batteries contained within a battery compartment. The device includes an adapter, which is placed inside of the battery compartment of the battery operated device; electrical contacts, which are positioned inside of the battery compartment by the adapter so as to create an electrical connection between said contacts and the battery contacts of the battery operated device; a battery box, which is designed to contain a battery or batteries not standard for use inside the battery compartment; an electrical connection between said contacts and the non-standard battery or batteries when placed within said battery box; an electronic or mechanical controller of the direction of flow of the electrical current provided by this invention through a battery operated device, said controller directly or indirectly electrically connected to said contacts; and an electronic or mechanical limiter of the maximum voltage that may occur across said contacts.

15 Claims, 4 Drawing Sheets

DEVICE TO PERMIT THE USE OF NON-STANDARD BATTERIES TO POWER BATTERY OPERATED DEVICES

BACKGROUND OF THE INVENTION

This invention relates generally to a device which enables a battery or batteries, whose shape and dimensions are non-standard, to be used as a source of non-damaging power for a battery operated device, such as a camera, which uses a standard battery, such as type 2CR5 or 223.

As is well recognized in the art, conventional disposable batteries have a short life. At the end of that life they must be disposed of, at significant expense to the environment, and replaced, at significant expense to the consumer. Rechargeable batteries, such as those comprised of nickel-cadmium, have a greatly extended useful life. As a result, the use of rechargeable batteries has gained great favor with environmentalists because far fewer disposable batteries are being placed in our landfills. Rechargeable batteries are also popular with consumers because the cost of using the battery operated device is substantially reduced. Rechargeable batteries to directly replace many common battery sizes, such as AA, C and D, are readily available to the consumer. No rechargeable batteries are currently produced to directly replace less common battery sizes such as type 2CR5 or 223.

Various devices exist to adapt a smaller battery or batteries so that they may be positioned within a battery compartment designed for a larger or differently dimensioned standard battery or batteries so as to provide power for a battery operated device. All currently available rechargeable batteries are of such size or shape that they cannot be placed within a battery compartment designed to house less common battery sizes such as type 2CR5 or 223. As a result, existing adaptive devices are not capable of adapting currently available rechargeable batteries for use with battery operated devices requiring battery sizes such as type 2CR5 or 223.

It would not be desirable to modify the battery compartment of a battery operated device in order to make use of the commonly available rechargeable batteries within the battery compartment. An alteration of this nature might lead to substantial changes in the design of the battery operated device. Such a modification might also permit severe damage to the electrically sensitive portions of the battery operated device due to the misapplication of power from the substituted non-standard batteries.

Various devices exist which employ an appropriately shaped adapter to locate contacts within a battery operated device's battery compartment and a connection to permit the use of a domestic electrical power supply to power the battery operated device. Such devices severely restrict the portability of the battery operated device which they power.

Many battery operated devices, such as toys, contain components that are not adversely affected when exposed to a reverse in the flow of electrical current through the components. Battery operated devices, such as cameras, containing electronic circuits or devices may be severely damaged by a current flow that is reversed from that provided by the standard battery.

Many battery operated devices, such as toys, contain components that may not be damaged by brief exposure to voltages in excess of those normally provided by their standard batteries. Battery operated devices, such as cameras, containing electronic circuits or devices may be severely damaged by even a brief exposure to voltages in excess of those normally provided by their standard batteries.

Accordingly it would be highly desirable to develop a device which would permit the use of non-standard batteries, particularly of a rechargeable type, to power battery operated devices as desired such that those battery operated devices are not exposed to damaging electrical potentials or restricted in their portability or utility.

OBJECTS AND ADVANTAGES

It is an objective of this invention to provide a device which will enable non-standard batteries, with larger dimensions than the standard battery or with sufficiently different shapes than the standard battery such that the non-standard battery cannot be contained within the battery compartment intended for the standard battery, to be substituted for a standard battery or batteries to power a battery operated device.

It is another objective of this invention to provide a device which makes possible the use of an alternative to the standard battery as a source of power such that the battery operated device retains its portability while being powered by said alternative to the standard battery.

It is a further objective of this invention to prevent electrical current provided by this invention from flowing through a battery operated device in a direction reversed from that provided by the standard battery.

It is also an objective of this invention to limit the maximum voltage which this device will supply to a battery operated device, to the voltage of the standard battery or batteries intended for use with that particular battery operated device.

It is another objective of this invention to provide an adapter which will permit the electrical connection of non-standard batteries to the battery operated device while requiring minimal modification to the battery compartment of the battery operated device such that the design of the battery operated device need not be changed and that the standard battery may be conveniently used when desired as originally intended.

It is a further objective of this invention to provide a housing for non-standard batteries such that they may be electrically connected to the adapter without compromising the portability of the battery operated device.

It is also an objective of this invention to permit the use of either rechargeable batteries of a specific size or disposable batteries of the same specific size interchangeably without exceeding the maximum voltage for which the battery operated device was designed.

Further objectives and advantages of the invention will become apparent from a consideration of the drawings and ensuing description.

SUMMARY OF THE INVENTION

A device is disclosed herein for providing power from a non-standard battery or batteries to a camera or other battery operated device normally powered by one or more batteries contained within a battery compartment. The power is provided in a manner that insures that the battery operated device is not damaged by the electrical potentials presented by the invention. The device is comprised of:

1) an adapter, which is placed inside of the battery compartment of the battery operated device;

2) electrical contacts, which are positioned inside of the battery compartment of the battery operated device by the adapter so as to create an electrical connection between said contacts and the battery contacts of the battery operated device;

3) a battery box, which is designed to contain a battery or batteries not standard for use inside the battery compartment of the battery operated device;

4) an electrical connection between said contacts and the non-standard battery or batteries when said battery or batteries are placed within said battery box;

5) an electronic or mechanical means of regulating the direction of flow of the electrical current provided by this invention through a battery operated device, said means directly or indirectly electrically connected to said contacts; and 6) an apparatus to limit the maximum voltage that may occur across said contacts. Said apparatus may consist of a Zener diode or other electronic or mechanical means of limiting voltage, directly or indirectly electrically connected to said contacts, or/and the interior cavity of the battery box, specifically sized and shaped with the placement of contacts within said cavity such that only a specific type, or types, of batteries may be placed within, in a specific quantity, or quantities, in accordance with the type used.

DETAILED DESCRIPTION OF THE PREFERRED EMBODIMENTS

The following description will be made in reference to the invention as it is employed to power a camera using non-standard batteries. The present invention is not, however, limited to such applications.

A variety of batteries, of both disposable and rechargeable types, when used singley or in groups, have the electrical potential to power a camera. The shape and size of a camera's battery compartment and the placement of the battery contacts within that battery compartment can effectively limit the selection of batteries to power the camera to one specific standard battery type.

To power a camera with non-standard battery types, particularly those with larger dimensions than the standard battery or with sufficiently different shapes than the standard battery such that the non-standard battery cannot be contained within the battery compartment of the camera, an electrical connection must be made between the non-standard battery or batteries and the battery contacts contained within the camera's battery compartment.

Figure 1:
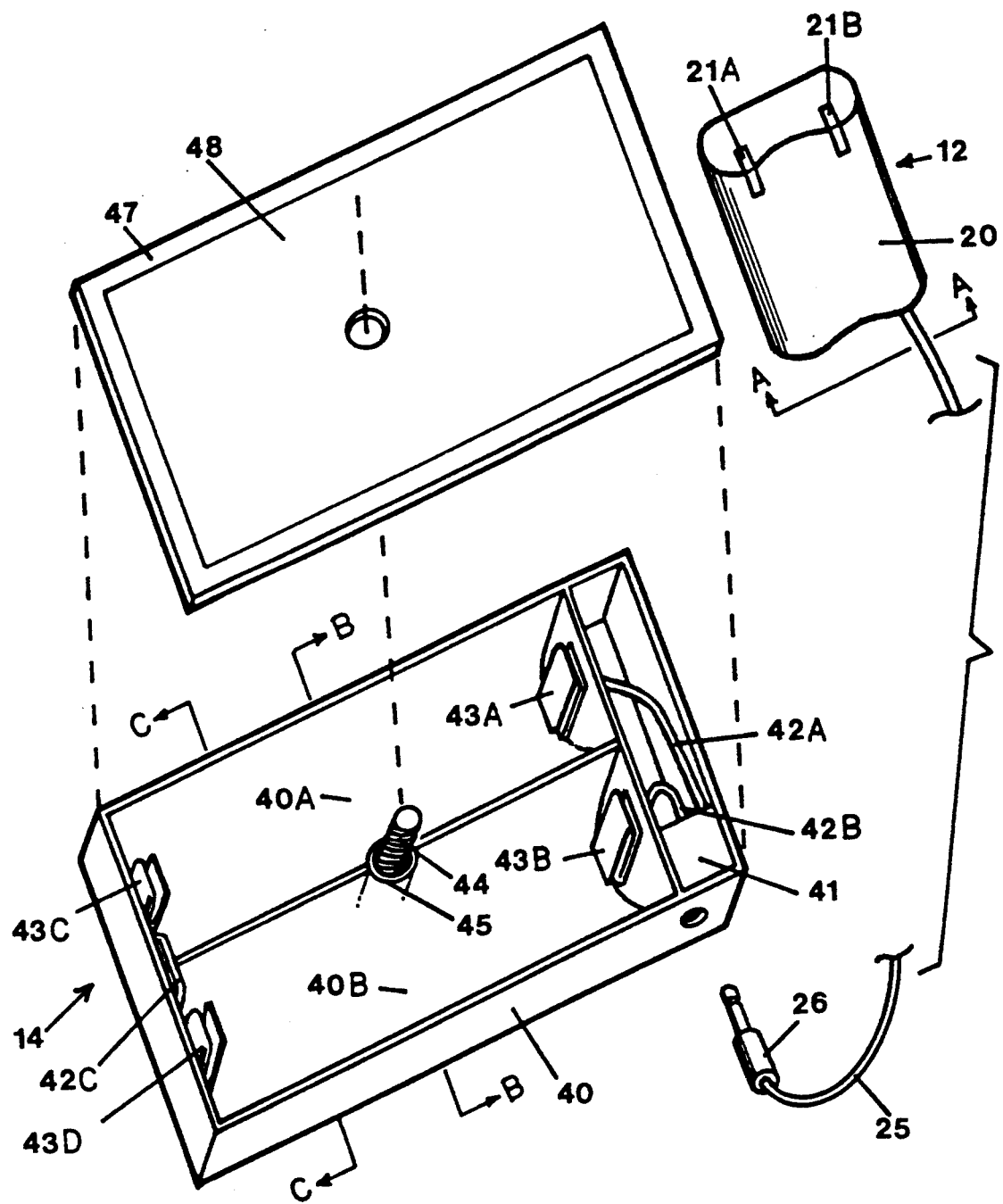
FIG. 1 is a top perspective view showing an embodiment of the device to permit the use of non-standard batteries with battery operated devices according to the present invention.

FIG. 1 shows an embodiment of a device to permit the use of 4 non-standard batteries (type AA) to power a camera specifically designed to be powered by 1 standard battery (type 2CR5) according to the present invention. The device consists of an adapter 12 and a battery box 14.

The adapter 12 is comprised of an adapter body 20 which holds two contacts 21 in a manner which will permit the contacts to be electrically connected to the battery contacts contained within the camera's battery compartment when the adapter is inserted into the compartment.

Figure 1A:
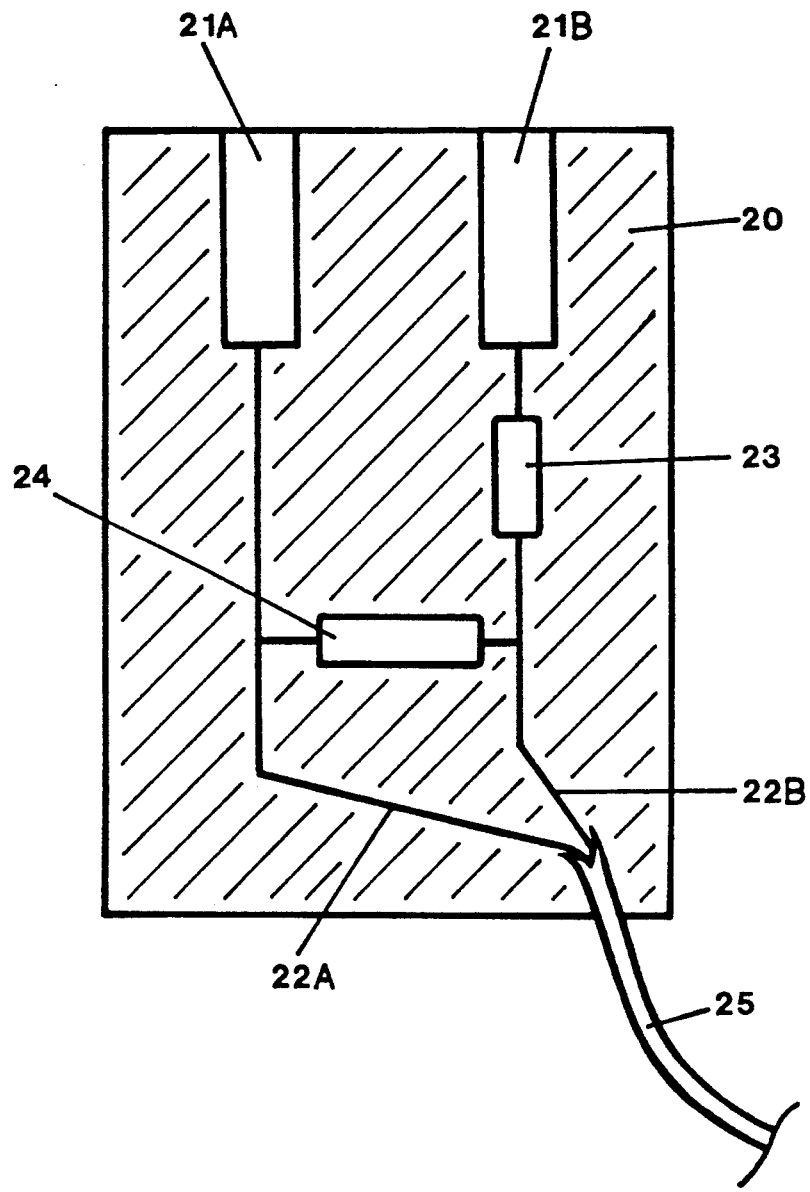
FIG. 1A is a fragmentary cross sectional view taken along line A—A of FIG. 1 showing essential parts of the adapter 12.

FIG. 1A shows a cross section of the adapter body 20. Contained within this embodiment of the adapter body 20 is a means to prevent electrical current provided by this invention from flowing through the camera in a direction reversed from that provided by the standard battery, in this case a diode 23. The diode 23 is electrically connected at one end to one of the contacts 21A, a portion of which is embedded within the adapter body 20, and electrically connected at the other end to one of the two conducting elements or wires 22A of the insulated two conductor conducting element or electrical cord 25. Also contained within the adapter body 20 is a means to regulate the voltage to be presented to the camera, in this case a Zener diode 24, which is electrically connected across the two conducting elements or wires 22A and 22B of the electrical cord 25. Additionally, the remaining contact 21B is electrically connected to wire 22B. A portion of the electrical cord 25 is contained within the adapter body 20 as are the uninsulated wires 22A and 22B which extend from the cord 25.

As shown in FIG. 1 the electrical cord 25 extends out of the adapter body 20 and is electrically connected to a two conductor or two pole plug 26.

Figure 1B:
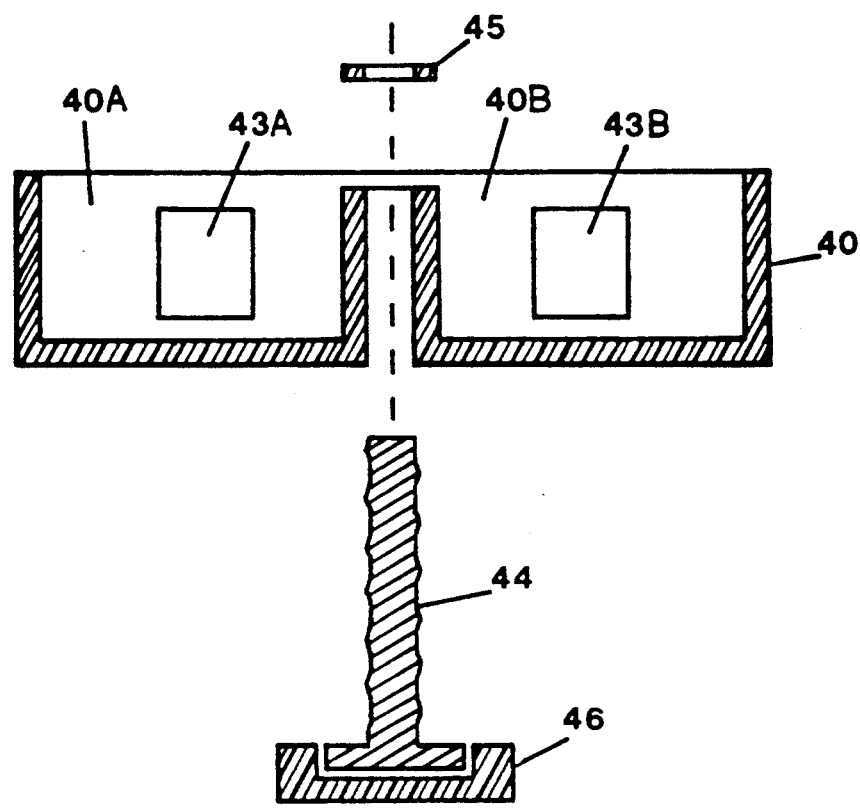
FIG. 1B is a fragmentary cross sectional view taken along line B—B of FIG. 1 showing essential parts of the battery box 14.
Figure 1C:
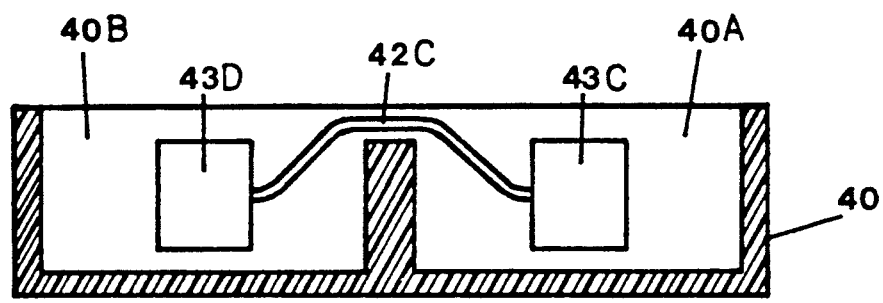
FIG. 1C is a fragmentary cross sectional view taken along line C—C of FIG. 1 showing essential parts of the battery box 14.

The battery box 14, as illustrated in FIGS. 1, 1A, and 1B, includes a two conductor or two pole jack 41 designed to accept and electrically connect with the plug 26. A conducting element or wire 42A electrically connects one conductor of the jack 41 to a contact 43A. A conducting element or wire 42B electrically connects the opposite conductor of the jack 41 to a contact 43B. The battery box 14 is shaped to hold a total of 4 type AA batteries arranged in two parallel cavaties generally designated as reference numerals 40A and 40B respectively. Each cavity 40A and 40B is shaped so as to contain a pair of AA batteries arranged in series. Contacts 43A and 43B are located within the cavities 40A and 40B respectively. The contacts 43A and 43B are placed within the cavities 40A and 40B so as to be located at the ends of the cavities 40A and 40B nearest the jack 41. Also located within the cavity 40A is a contact 43C. The contact 43C is placed within the cavity 40A so as to be located at the opposite end of the cavity 40A from the contact 43A. In a similar manner, a contact 43D is located within cavity 40B so as to be located at the opposite end of the cavity 40B from the contact 43B. The contacts 43C and 43D are electrically connected by an electrical conducting means or wire 42C.

FIGS. 1 and 1B also show a mounting bolt 44 passing through the battery box 14. The bolt is arranged so that the head of the bolt is below the bottom of the battery box 14 and the threaded male end of the bolt protrudes through the top of the battery box 14. The bolt is held in this position by a retaining ring 45. A knurled thumb cap 46 is placed over the head of the mounting bolt 44. The mounting bolt 44 also passes through a battery box lid 47 and a gasket 48 which is secured to the battery box lid 47.

Figure 2:
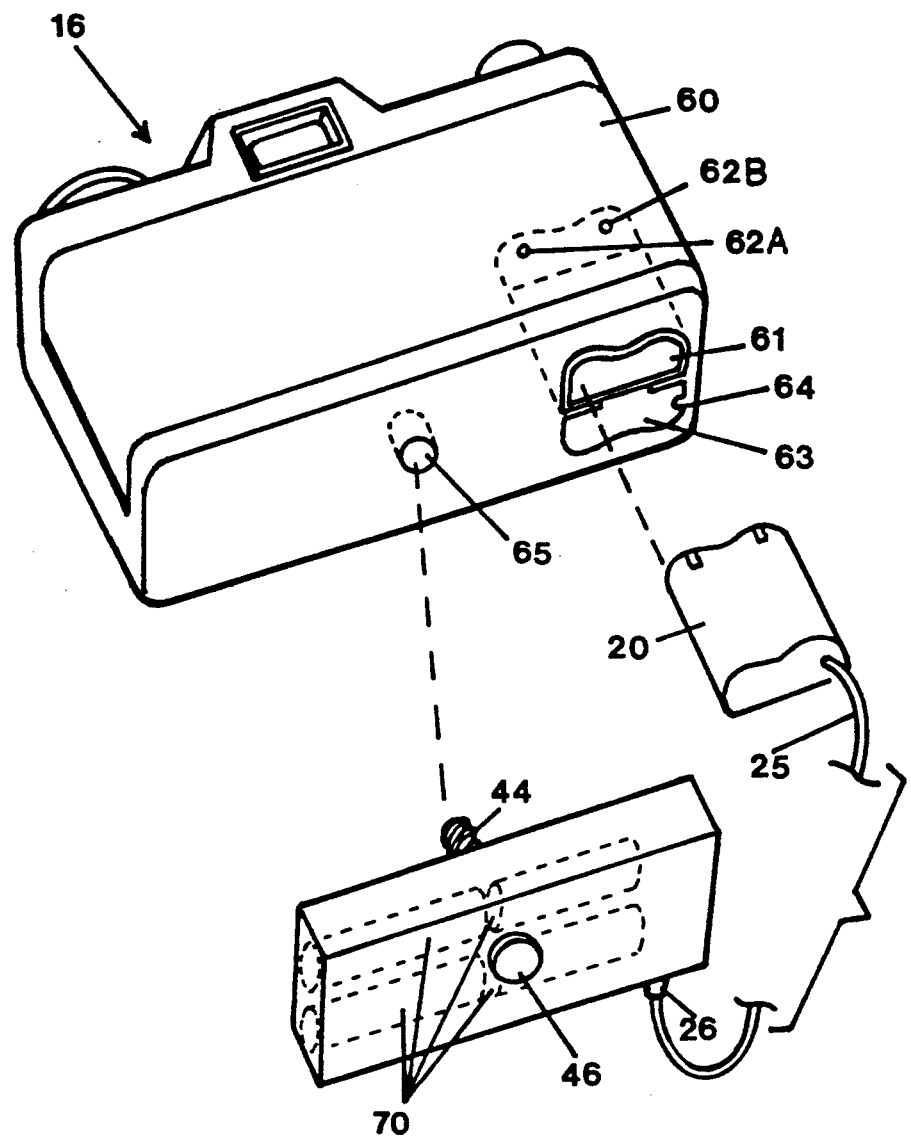
FIG. 2 is an exploded bottom perspective view showing the manner of use of the device shown in FIG. 1.

FIG. 2 illustrates the manner of use of this embodiment to permit 4 non-standard batteries type AA to power a camera specifically designed to be powered by 1 standard battery type 2CR5 according to the present invention. A camera 16 is illustrated in FIG. 2. In the camera body 60 is located a battery compartment 61 which contains battery contacts 62A and 62B. Attached by a hinge or other means to the bottom and otherwise open end of the battery compartment 61 is a battery compartment door 63. To prepare a camera 16 for use with this embodiment of the invention, a relief, a hole or a notch 64 must be created in the camera's battery compartment door 63.

To employ the device the adapter body 20 is placed within the battery compartment 63 permitting contacts 21A and 21B to electrically connect to the camera's battery contacts 62A and 62B respectively. The electrical cord 25 and the attached plug 26 extend out of the open end of the battery compartment 61. The electrical cord 25 is aligned with the notch 64 so as to allow the battery compartment door 63 to be closed. The battery compartment door 63 is then closed. Two pairs of AA type non-standard batteries 70, each pair arranged in series, are then placed in the cavities 40A and 40B of the battery box body 40 such that the two pairs are electrically connected in series through contact 43C wire 42C and contact 43D. The battery box lid 47 and gasket 48 are placed over the battery box body 40 so as to close the battery box 14 and permit the mounting bolt 44 to pass through the lid 46 and gasket 47. The mounting bolt 44 is then threaded into the tripod mounting hole 65 using the knurled thumb cap 46. The mounting bolt 44 thus connects the battery box 14 to the camera body 60 permitting portability of the camera while the invention is in use. Plug 26 is then inserted into jack 41.

At this point, the electrical potential of the non-standard batteries passes through the contacts 43A and 43B, the wires 42A and 42B, the two conductors of jack 41 the two conductors of plug 26, the two conductors 22A and 22B of electrical cord 25, the diode 23 and is present at the contacts 21A and 21B. The orientation of the electrical potential present at the contacts 21A and 21B is dependant on the orientation of the non-standard batteries within the battery box.

To prevent the electrical current provided by this invention from flowing through an electrically connected battery operated device in a direction reversed from that provided by the standard battery, this embodiment of the invention employs the diode 23 and the construction of the adapter body 20. Electrical connection of the diode 23 to one of the contacts 21A or 21B insures that an electrical current can only flow from one of the contacts 21A or 21B to the corresponding battery contact 62A or 62B and from the opposite battery contact 62B or 62A to the opposite corresponding contact 21B or 21A. The direction of the permitted current flow is determined by the orientation of the diode 23 in electrical connection to the contact 21A or 21B.

The adapter body 20 is constructed in such a manner and supports the contacts 21A and 21B in such a manner that when inserted into the battery compartment 61 only one orientation of the contacts 21A and 21B in electrical connection with the camera's battery contacts 62A and 62B may be obtained. By determining the direction of current flow through the contacts 21A and 21B through the use of diode 23, the adapter body may then be constructed to insure that the contacts 21A and 21B are oriented such that the direction of electrical current flow to and from the contacts 21A and 21B corresponds to the proper direction of electrical current flow to and from the camera's battery contacts 62A and 62B. Therefore, in the event of a reverse polarity being present at the contacts 21A and 21B, no damaging current will flow through the battery operated device. To correct the reverse polarity condition, the orientation of the positive and negative poles of the non-standard batteries 70 in the battery box 14 must be reversed.

To prevent an excessive electrical potential, in this embodiment a voltage above the 6 volt maximum voltage of the standard 2CR5 battery, from being present at the contacts 21A and 21B, the battery box 14 is constructed so as to limit the number of non-standard batteries that can be contained within the cavities 40A and 40B. This embodiment permits only 4 type AA non-standard batteries to be connected in series within the battery box 14.

Although only a single preferred embodiment of the invention has been described, it will clearly be recognized by those skilled in the art that numerous variations are possible within the intended scope of the invention. Some of those variations include the placement of one or both of the means of regulating the electrical potentials of the invention in the battery box. Other variations include adapters that are adjustable or variable in size or shape, battery boxes capable of containing varying types and quantities of batteries, and mounting or carrying devices allowing the battery box to be portable without being directly attached to the device that it powers. The above descriptions should not be construed as limiting, rather, it is intended that the scope of the invention be defined solely by the appended claims.

What is claimed is:

1. A device to permit the use of non-standard batteries to power battery operated devices comprised of:

an adapter, which is placed inside of the battery compartment of the battery operated device;

electrical contacts, which are positioned inside of the battery compartment of the battery operated device by the adapter so as to create an electrical connection between said contacts and the battery contacts of the battery operated device;

a battery box, which is designed to contain a battery or batteries not standard for use inside the battery compartment of the battery operated device;

an electrical connection between said contacts and the non-standard battery or batteries when said battery or batteries are placed within said battery box;

an electronic or mechanical means of regulating the direction of current flow from the non-standard batteries to the battery operated device, directly or indirectly electrically connected to said contacts; and an electronic or mechanical means of limiting the maximum voltage that may occur across said contacts; or an apparatus to limit the maximum voltage that may occur across said contacts. Said apparatus may consist of a Zener diode or other electronic or mechanical means of limiting voltage, directly or indirectly electrically connected to said contacts, or/and the interior cavity of the battery box, specifically sized and shaped with the placement of contacts within said cavity such that only a specific type, or types, of batteries may be placed within, in a specific quantity, or quantities, in accordance with the type used.

2. An adapter as claimed in claim 1, wherein said adapter holds at least two contacts in a manner which will permit the contacts to be electrically connected to the battery contacts contained within the battery powered device's battery compartment when the adapter is inserted into the compartment.

3. An adapter as claimed in claim 1, wherein said adapter has the same shape as the standard battery or batteries as placed singly or collectively into the battery operated device's battery compartment.

4. An adapter as claimed in claim 1, wherein the shape of said adapter is employed solely or in part to locate the contacts as defined in claim 1.

5. An adapter as claimed in claim 1, wherein said adapter employs a spring or springs to locate the contacts as defined in claim 1.

6. An adapter as claimed in claim 1, wherein said adapter body is comprised of two halves which are fitted with respect to each other in a manner which permits them to be movable in relation to each other in a longitudinal direction so that the length of the adapter body may be varied by the compression or decompression of a spring or springs.

7. An adapter as claimed in claim 1, wherein said adapter body is comprised of two halves which are fitted with respect to each other in a manner which permits them to be movable in relation to each other in a longitudinal direction so that the length of the adapter body may be varied by the rotation of a threaded means.

8. A battery box as claimed in claim 1, wherein said battery box contains a limited number of batteries not standard for use inside the battery compartment of the battery operated device so as to limit the maximum voltage that the invention may supply to the battery operated device.

9. A battery box as claimed in claim 1, wherein said battery box contains electrical connections so as to permit the electrical potential of the non-standard batteries placed therein to be electrically connected directly or indirectly to the contacts as defined in claim 1.

10. A battery box as claimed in claim 1, wherein said battery box contains electrical connections so as to permit the electrical potential of the non-standard batteries placed therein to be electrically connected directly or indirectly to the contacts as defined in claim 1.

11. A battery box as claimed in claim 1, wherein said battery box contains electrical connections so as to permit the non-standard batteries placed therein to be electrically connected in series.

12. A battery box as claimed in claim 1, wherein said battery box contains electrical connections so as to permit the non-standard batteries placed therein to be electrically connected in parallel.

13. The adapter, the battery box and the electrical connections as defined in claim 1, wherein said adapter, said battery box or said electrical connections contain or support an electronic or mechanical means of regulating the direction of current flow.

14. The adapter, the battery box and the electrical connections as defined in claim 1, wherein said adapter, said battery box or said electrical connections contain, support or comprise in whole or in part an electronic or mechanical means of limiting the maximum voltage that may occur across said contacts.

15. A battery box as claimed in claim 1, wherein said battery box is attached to or contains a mounting device which permits said battery box to be transported in conjunction with the device powered.

* * * * *